UNITED STATES PATENT OFFICE.

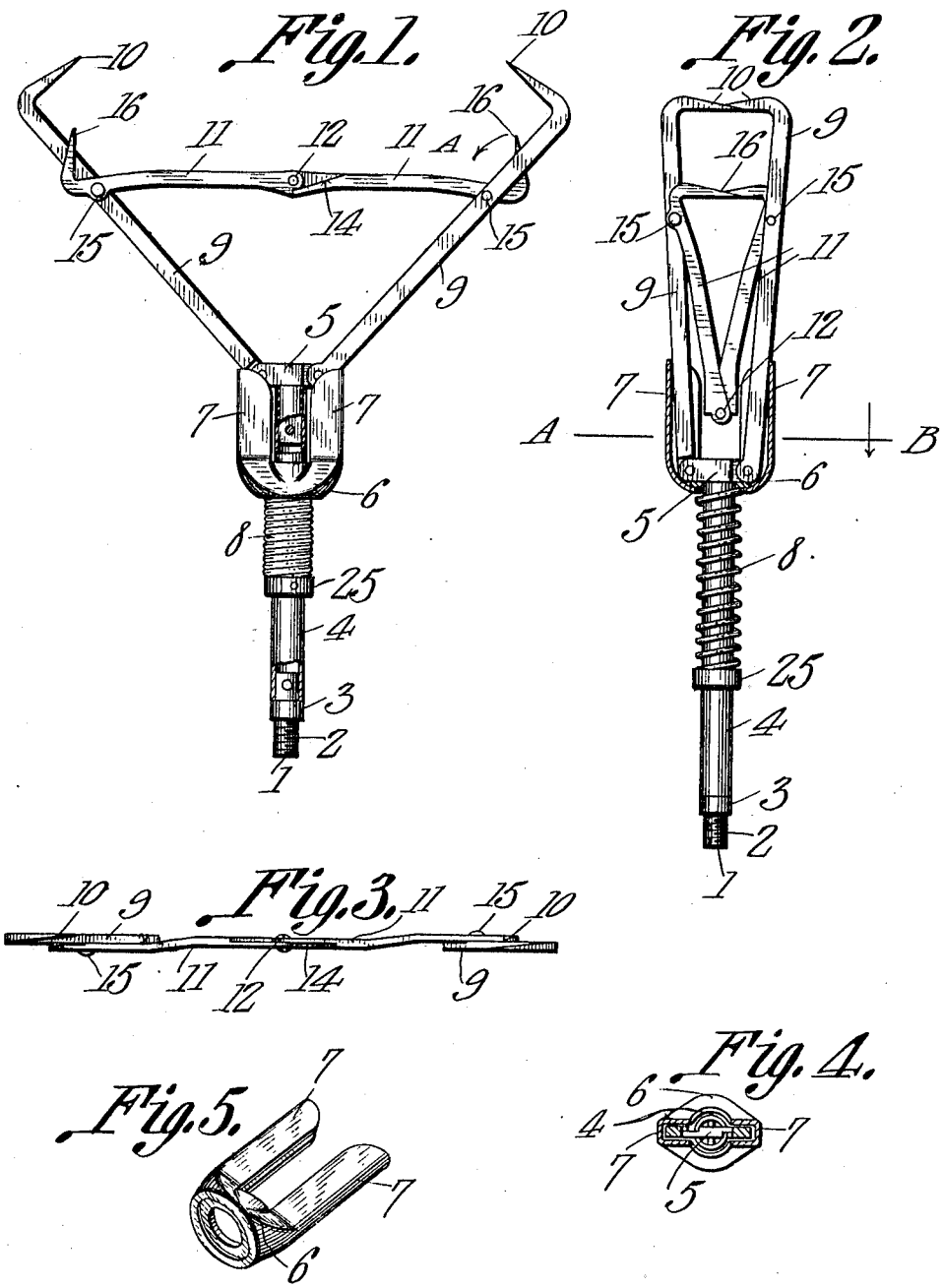

LAWRENCE DALE, OF EAST STROUDSBURG, PENNSYLVANIA.

FISH-HOOK.

980,212.  Specification of Letters Patent.  Patented Jan. 3, 1911.

Application filed May 3, 1910.  Serial No. 559,102.

*To all whom it may concern:*

Be it known that I, LAWRENCE DALE, a citizen of the United States, residing at East Stroudsburg, in the county of Monroe and State of Pennsylvania, have invented a new and useful Fish-Hook, of which the following is a specification.

It is the object of this invention to provide a gaff hook, the pivotally mounted arms of which may be locked in open position, to be sprung into locked position by the contact between the body of the entrapped animal and a portion of the device.

Another object of the invention is to provide a gaff hook and a locking device for holding the constituent portions of the gaff hook apart, the locking device operating, when the device is sprung, to draw the entrapped animal firmly within the clutch of the device.

Another object of the invention is to provide a device of this character with a slidably mounted keeper for actuating the movable gaff arms, the keeper serving to force the gaff arms to a closed position, and there to lock them securely against movement, saving when the keeper itself is manipulated by the hand of the operator.

With the above and other objects in view, the invention consists in the novel construction and arrangement of parts hereinafter described, delineated in the drawings, and claimed.

Changes properly falling within the scope of what is claimed, may be made, without departing from the spirit of the invention.

In the accompanying drawings,—Figure 1 is a side elevation showing the device locked in open position; Fig. 2 is a side elevation showing the device in closed position, parts being in section; Fig. 3 is a fragmental top plan of the gaff arms and the toggle; Fig. 4 is a section on the line A—B of Fig. 2; and Fig. 5 is a perspective of the collar.

The device includes, as a primary and fundamental element, a shank comprising a body 1, which, at one end, may be threaded, as denoted by the numeral 2, for engagement with a handle. The body 1 is provided with a shoulder 3, adapted to receive a tube 4, a T-shaped head 5 being introduced into the free end of the tube 4, and there secured in any suitable manner.

A collar is slidably mounted upon the tubular portion 4 of the shank, and this collar comprises a dished socket 6, provided with trough-like extensions 7, the open sides of which are disposed toward each other. The socket 6 is actuated toward the head 5 by means of a helical compression 8 bearing at one end against an annular shoulder 25 and secured to the tube 4, and at the other end, against the socket 6. The head 5 acts as a stop, to limit the sliding movement of the socket 6 under the action of the spring 8.

Pivotally connected to the head 5, are gaff arms 9, provided at their free ends with prongs 10 which are extended toward each other. These gaff arms fit closely, yet slidably, within the trough-like extensions 7 of the socket 6. It will be seen that, under the actuation of the spring 8, the ends of the extensions 7 will bear against the gaff arms 9, tending to force them together. When, under the action of the spring 8, the socket 6 is brought into bearing with the head 5, the extensions 7 will protrude a considerable distance beyond the head 5, and engage the arms 9 at a considerable distance from their pivotal mounting. Thus the arms 9 will be held together, the arms being capable of being separated only when the hand of the operator is placed upon the socket 6, and the socket slid. In other words when the prongs 10 of the gaff arms 9 are disposed close together, the arms cannot be separated by an effort to pull them apart. Thus, the arms cannot be engaged accidentally, and the device opened. When the device is swung into closed position, it can be opened only by a specific manipulation of the socket 6, and thus injury through an accidental spreading of the gaff arms 9, is obviated. The trough-like extensions 7 serve not only to actuate the gaff arms 9 into a closed position and to hold them there, but, as well, to serve as a means for guiding the gaff arms 9, while they are moving from an open into a closed position.

In order to lock the gaff arms 9 in an open position, a toggle is provided, the constituent portions of which are denoted by the numeral 11. The adjacent ends of the portions 11 of the toggle are pivotally connected, as shown at 12, and halved into each other, as denoted by the numeral 14. Intermediate their ends, the portions 11 of the toggle are pivotally connected, as shown at 15, to the intermediate portions of the gaff arms 9. Upon the free, remote ends of the portions 11 of the toggle, are inwardly extended prongs 16.

By referring to Fig. 1 of the drawings, wherein the device is shown in open position, it will be seen that the prongs 16 of the portions 11 of the toggle are located outwardly, beyond the points of the prongs 10 of the gaff arms 9. By reason of this fact, when the device is thrust downwardly upon a fish or other animal, such animal will strike the portions 11 of the toggle, between the points 15 where the portions 11 are pivotally connected with the gaff arms 9. The advantage incident to this construction is that as soon as the body of the entrapped animal strikes the portions 11 of the toggle, the toggle will at once close, causing the gaff arms 9, under the actuation of the spring 8, to move from an open to a closed position. If the prongs 16 were not located outwardly, beyond the points of the prongs 10, the animal, passing between the prongs 10, might strike the constituent portions 11 of the toggle beyond the fulcrum points 15, the animal holding the toggle more firmly in a position to prevent the gaff arms 9 from closing together. Such a contingency, however, is obviated when, as shown and hereinbefore described, the points of the prongs 16 are located outwardly, beyond the points of the prongs 10, when the device is in open position. It should be noted, moreover, that when the gaff arms 9 move from an open to a closed position, the points of the prongs 16 will move in the direction of the arrow A. Thus, as the points of the prongs 16 are embedded in the flesh of the animal, the animal will be drawn inwardly and upwardly toward the head 5, presupposing that the device is thrusted downwardly, and the animal struck from above. Thus, the prongs 16 serve, not merely as an additional holding means, coöperating with the prongs 10 of the gaff arms, but, as well, as elements, having a specific movement, distinct from the movement of the prongs 10 of the gaff arms, which said movement pulls the entrapped animal within the grip of the device.

In practical operation, the socket 6 is seized, and thrust away from the head 5, compressing the spring 8. By this operation, the arms 8 will be freed and the same may be spaced apart at their ends, the constituent portions 11 of the toggle moving into alinement and locking the gaff arms 9 apart. When the animal is struck, the portions 11 of the toggle will fold together, freeing the gaff arms 9, the prongs 10 and 16 engaging the animal, under the action of the spring 8, the prongs 16 acting, as hereinbefore stated, to draw the animal within the grip of the device.

Having thus described the invention, what is claimed is:—

1. A device of the class described comprising coöperating pivotally mounted game-holding arms; and a toggle, the constituent members of which are pivoted intermediate their ends to the game-holding arms and provided at their remote ends with angularly disposed prongs.

2. A device of the class described comprising pivotally mounted gaff arms terminally provided with inwardly projecting prongs; and a toggle for locking the gaff arms in open position, the constituent members of the toggle being pivoted intermediate their ends to the gaff arms and provided at their remote ends with prongs positioned to draw entrapped animals between the prongs of the gaff arms when the gaff arms move from an open to a closed position.

3. A device of the class described comprising a shank; gaff arms terminally pivoted to the shank; a collar slidable upon the shank and bearing against intermediate portions of the gaff arms; resilient means for actuating the collar to bear upon the gaff arms; and a toggle connecting the gaff arms to lock the same in open position.

4. A device of the class described comprising a shank; gaff arms pivoted to the shank; a collar slidable upon the shank and bearing against the gaff arms; resilient means for actuating the collar to bear upon the gaff arms; and a stop for limiting the movement of the collar under the action of the resilient means; the collar being prolonged beyond the stop to lock the arms in closed position.

In testimony that I claim the foregoing as my own, I have hereto affixed my signature in the presence of two witnesses.

LAWRENCE DALE.

Witnesses:
  G. S. TRAVIS,
  ELMER STONE.